(12) United States Patent
Fellner et al.

(10) Patent No.: US 8,656,572 B2
(45) Date of Patent: Feb. 25, 2014

(54) METHOD FOR INSTALLING A PROFILED EXTRUDED SECTION

(71) Applicant: Metzeler Automotive Profile Systems GmbH, Lindau/Bodensee (DE)

(72) Inventors: Johannes Fellner, Lindau (DE); Bernd Westerhoff, Lindau (DE); Luciano Castagnola, Esslingen (DE); Oliver Deuscher, Engstingen (DE); Steffen Hieber, Stuttgart (DE); Manfred Schuck, Sindelfingen (DE)

(73) Assignee: Metzeler Automotive Profile Systems GmbH (DE)

( * ) Notice: Subject to any disclaimer, the term of this patent is extended or adjusted under 35 U.S.C. 154(b) by 0 days.

(21) Appl. No.: 13/737,223

(22) Filed: Jan. 9, 2013

(65) Prior Publication Data

US 2013/0117994 A1    May 16, 2013

Related U.S. Application Data

(63) Continuation of application No. PCT/EP2011/061667, filed on Jul. 8, 2011.

(30) Foreign Application Priority Data

Jul. 9, 2010 (DE) .......................... 10 2010 026 669

(51) Int. Cl.
*B23Q 17/00* (2006.01)
(52) U.S. Cl.
USPC ...................................................... 29/407.01
(58) Field of Classification Search
USPC ................ 29/407.01, 428, 450, 412, 417
See application file for complete search history.

(56) References Cited

U.S. PATENT DOCUMENTS

| 5,468,439 | A | 11/1995 | Kranz |
| 6,598,348 | B2 | 7/2003 | Palicki |
| 7,478,863 | B2 | 1/2009 | Krause |
| 8,398,808 | B2 * | 3/2013 | Grohmann et al. ........ 156/308.2 |

FOREIGN PATENT DOCUMENTS

| DE | 102005028069 A1 | 5/2006 |
| EP | 0857599 A1 | 8/1998 |
| EP | 1733839 A1 | 12/2006 |

OTHER PUBLICATIONS

International Search Report dated Aug. 30, 2011 (2 pages) in corresponding International Patent Application No. PCT/EP2011/061667.

* cited by examiner

*Primary Examiner* — John C Hong
(74) *Attorney, Agent, or Firm* — Brian B. Shaw, Esq.; Thomas B. Ryan; Harter Secrest & Emery LLP

(57) ABSTRACT

The invention relates to a method for installing a profiled sealing section, a profiled edge protection section or similar profiled extruded section formed of an extruded material on a component of a motor vehicle, in which the extruded material (10) is wound off a reel, at least one length section having a predefined length of the extruded material is cut off the extruded material as the profiled sealing section, profiled edge protection section or similar profiled extruded section to be installed, and is installed on the component. Prior to being wound onto the reel, the extruded material (10) is prepared such that the extruded material (10) comprises defect-free usage sections (14) having a predefined usage length (16), between which intermediate sections (18) having a predefined intermediate length (20) are arranged. As part of the installation, the intermediate sections (18) are removed from the extruded material (10) and separated as scrap.

Figure 1:
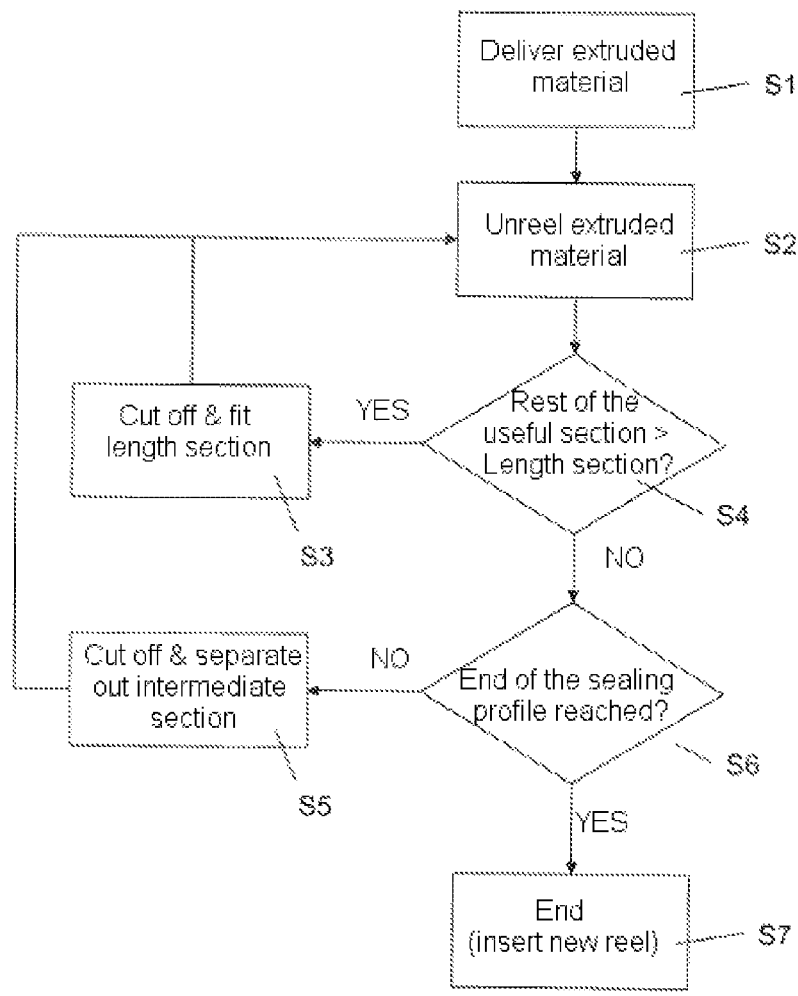

20 Claims, 2 Drawing Sheets

METHOD FOR INSTALLING A PROFILED EXTRUDED SECTION

RELATED APPLICATIONS

The present application is a continuation of International Application No. PCT/EP2011/061667, filed Jul. 8, 2011 claiming priority to German Patent Application No. 10 2010 026 669.8, filed Jul. 9, 2010, which International application is hereby incorporated by reference.

BACKGROUND AND SUMMARY OF THE INVENTION

The invention relates to a method for fitting an extruded profile on a vehicle body or a vehicle component according to the preamble of patent claim 1, as is known for example from the generic EP 1 733 839 A1.

EP 1 733 839 A1 discloses a method for forming a seal or cover on a component, in particular a vehicle door or a door cutout in a vehicle body. In this method, after it has been produced, an extruded material that forms the seal or the cover first of all undergoes a quality check in which defective sections are marked; the extruded material checked and marked in this way is subsequently rolled up onto a roll. At the vehicle manufacturer, the checked and marked extruded material is unwound from the roll; the unwound extruded material is supplied to the component, connected continuously to the component in the longitudinal direction of the strand and an end section corresponding to the length of the seal is cut off the supplied extruded material. In the process, the extruded material unwound from the roll is checked before being connected to the component, in order to detect the portions characterized as defective. These sections of the extruded material that are marked as defective are cut off and separated out as waste.

This method allows the application of defect-free extruded material onto a component, but requires a large amount of effort at the vehicle manufacturer, since the extruded material has to be checked continuously for defect markings.

It is therefore the object of the present invention to provide a method for fitting an extruded profile on a vehicle body or a vehicle component, said method causing a smaller amount of effort at the vehicle manufacturer.

This object is achieved by a method having the features of patent claim 1. Advantageous configurations having expedient and non-trivial developments of the invention are specified in the dependent claims.

In the method according to the invention, sealing profiles, edge protection profiles or the like, which are formed from an extruded material, are fitted on vehicle bodies or vehicle components. In the process, the extruded material is unwound from a reel, and length sections of the extruded material are cut sequentially off the unwound extruded material. These length sections are fitted as sealing profiles, edge protection profiles or the like onto the vehicle bodies or vehicle components. In the following text, the expression "sealing profile" is intended to include not only sealing profiles within the actual meaning of the word but also edge protection profiles and the like.

According to the invention, it is provided that the extruded material is made available in such a way that the extruded material comprises defect-free useful sections having a predefined useful length, between which intermediate sections having a predefined intermediate length are arranged. The extruded material thus consists of defect-free useful lengths, between which intermediate sections having a predefined length are arranged at periodic spacings. During the fitting of the sealing profiles, the intermediate sections are cut out of the extruded material and separated out as waste. Thus, only the useful sections (known as defect-free) are used for seal fitting, and the intermediate sections (which may contain errors, defects, etc.) are disposed of as waste.

Before the extruded material is unwound from the reel at the vehicle manufacturer and is fitted onto the vehicle body or the vehicle component, the extruded material is prefabricated in the above-described manner. This generally takes place before the extruded material is wound onto the reel and is generally carried out by the supplier of the extruded material. Here, the extruded material is first of all checked and sections having a length corresponding to the useful length (or a multiple of the useful length) are produced, said sections being joined together in such a way that the joins are located in the region of the intermediate sections. Defective regions—in contrast to the technical teaching in EP 1 733 839 A1—are not marked, but instead the extruded material is prefabricated such that regions of the extruded material that are located outside the indicated range of tolerance and thus deviate from the desired state are either cut out or are positioned in the intermediate sections of the extruded material before the extruded material is wound up onto the roll. At the vehicle manufacturer—contrary to the technical teaching in EP 1 733 839 A1—defective sections are not cut off on the basis of markings, but rather intermediate sections having a fixedly predefined intermediate length are cut off periodically at fixedly predefined spacings, regardless of whether these intermediate sections have defects or not.

The method according to the invention thus avoids checking of the extruded material at the vehicle manufacturer, i.e. during the unwinding of the extruded material from the reel and during the application of the extruded material: Since the length of the defect-free useful sections is known, a plurality of defect-free length sections of variable length can be cut to length from the unreeled extruded material and applied, until the useful section has been used up. Once the end of this useful section has been reached, a piece of extruded material having a previously known length (corresponding to the intermediate section, which may have defects) can be cut out; subsequently, a further defect-free useful section is available. There is no need to check the extruded material for defects at the vehicle manufacturer—the vehicle manufacturer can unequivocally decide from the absolute length of the extruded material hitherto unreeled from a reel whether the length section currently pending for processing is defect-free (i.e. should be assigned to a useful section) or may have defects and therefore has to be cut off and separated out (i.e. should be assigned to an intermediate section). Since checking of the extruded material at the vehicle manufacturer is dispensed with, there is no need for the associated checking device. Furthermore, the absolute lengths of the useful and intermediate sections are known, and so the start and end points of these useful and intermediate sections do not need to be marked. In this way, costs can be saved at the manufacturer of the extruded material.

With the aid of the method according to the invention, the length section, to be fitted on the component, of an extruded profile unreeled from a reel is thus applied to the component without further checking. Similarly, intermediate sections are cut at regular intervals out of the extruded profile unreeled from the reel and are separated out as waste, without these intermediate sections being checked for defects, etc.

Checking that the extruded material is in the predefined state temporally before unwinding from the reel and in particular temporally before being wound onto the latter also has the advantage that this checking no longer has to take place during the fitting, for example at a manufacturer of the component, but can take place in upstream processes, for example at a supplier of the extruded material. This has the beneficial effect of low fitting costs.

In an advantageous embodiment of the invention, the extruded material is provided with a periodic calibration pattern before being unwound from the reel, preferably already before the extruded material is wound onto the latter. This calibration pattern serves to represent an absolute scale of length along the extruded material, such that the calibration pattern can be used to equalize the already unreeled length of the extruded material and it is possible to recognize when the end of a useful region or of an intermediate region is reached. This is advantageous insofar as the extruded material is generally wound onto the reel at the manufacturer in a particular, possibly random and non-constant elongation state in particular in the direction of longitudinal extent of the extruded material and subsequently at the vehicle manufacturer is first of all unrolled during the seal application, possibly in a random and non-constant elongation state, and is then fitted. The elongation state under which the extruded material is rolled onto the reel therefore generally differs from the elongation state in which the extruded material is applied. The calibration pattern can be used as an absolute scale in order to compensate the length differences of the extruded material that are caused by these differing elongation states.

During the unwinding of the extruded material from the reel, it is possible to add up the length of the already unwound extruded material, for example with the aid of an accompanying counter, with the periodic calibration pattern being sensed. Once the end of the useful section has been reached, the intermediate section that follows the useful section is cut off the extruded material and the counter is put into an initial state, being set for example to zero, in order in this way to have an absolute reference again for the following length section to be fitted. Alternatively, the counter can add up the entire length of the extruded material located on the reel, with it being signaled, each time that the (precalculated) positions of the end points of the useful sections are reached, that an intermediate section to be cut out is pending.

The calibration pattern can be formed for example by equidistant, colored points, lines or the like on the extruded material. If the extruded profile is a self-adhesive profile having an adhesive strip, the calibration pattern can be arranged on a tear-off material ("liner") to be removed from the extruded material, said tear-off material covering the adhesive strip and being pulled off during the fitting of the sealing profile. Furthermore, a regular marking that is visible under ultraviolet light can be provided as the calibration pattern. Also possible for realizing the calibration pattern are mechanical markings such as flutes, recesses, elevations or the like.

In order to sense the calibration pattern, there may be provided an optical sensing device which can sense the marking or the periodic pattern in a wavelength range of light visible to the human eye or in the ultraviolet range. It is likewise possible to sense the calibration pattern by means of a tactile sensing device which scans the surface of the extruded material and senses the surface quality and in particular the calibration pattern formed as a mechanical marking.

The extruded profile to be fitted may be a sealing profile or an edge protection profile which is adhesively bonded to the vehicle body or the vehicle component and/or is connected thereto via a plug connection. In this case, the extruded profile is for example plugged onto a joining flange of the vehicle body. As already indicated, in the case of adhesive bonding of the extruded profile to the component, what is known as a liner can be provided, said liner covering an adhesive point, in particular an adhesive bead, of the extruded profile and being removed from the extruded profile, or extruded material, prior to adhesive bonding.

Advantageously, the corresponding length sections are cut off in an automated manner, for example by means of a robot. In this way, the method can be carried out particularly quickly and cost-effectively. It is likewise beneficial to quick and cost-effective carrying out of the method when the extruded profile is likewise connected in an automated manner to the component. The component may for example be a door, a flap or similar wing element of a motor vehicle.

In order to fit the extruded profile on the component, a head of the robot for fitting the extruded profile can be held preferably in a stationary manner, while the component, for example in the form of the wing element, is guided by the robot past the head and thus is moved in relation to the head.

If for example the extruded profile is applied to the joining flange in a door cutout, flap cutout or the like of a body of a motor vehicle, the body is preferably held in a stationary manner while the head of the robot or of the fitting device is moved in a manner guided by the robot along the door cutout, the flap cutout or the like.

It is likewise possible for the fitting of the extruded profile also to be carried out in the case of a moved body which is moved in translation for example by means of an assembly line or otherwise. In this case, the robot or the fitting device having the head is moved together with the body in the direction thereof, so that no relative movements occur between the robot and the body during fitting, but merely relative movements between the body and the extruded profile to be fitted via the head of the robot are carried out.

Further advantages, features and details of the invention will become apparent from the following description of a preferred exemplary embodiment and on the basis of the drawings, in which:

BRIEF DESCRIPTION OF THE DRAWING FIGURES

Figure 2:
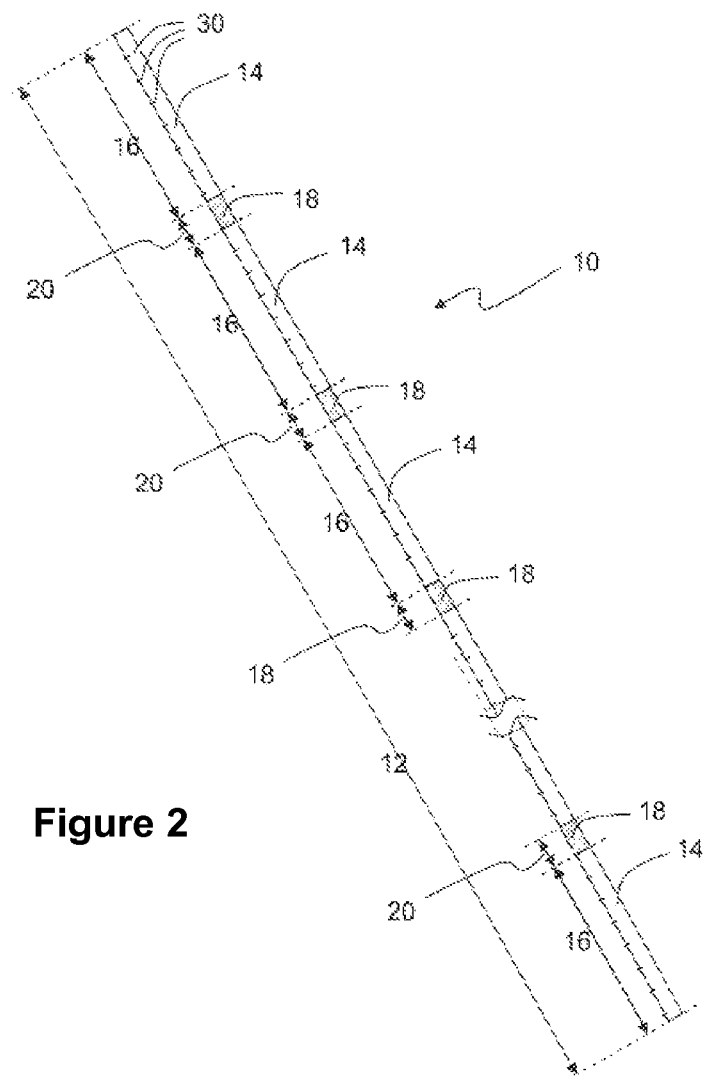

FIG. 1 shows a schematic flow of a method according to the invention for fitting an extruded material on a component of a motor vehicle, FIG. 2 shows a schematic plan view of an extruded material prefabricated according to the invention.

The features and combinations of features mentioned previously in the description and the features and combinations of features mentioned below in the description of the figures and/or shown alone in the figures can be used not only in the combination given in each case but also in other combinations or on their own, without departing from the scope of the invention.

FIG. 1 shows a schematic flow diagram of a method 1 for fitting a sealing profile formed from an extruded material on a component of a motor vehicle, in which equidistant length sections of predefined length of the extruded material are cut periodically off the latter and are separated out as waste.

In a first step S1, a manufacturer and supplier delivers an extruded material 10 in the form of what is known as an endless sealing profile to a manufacturer of motor vehicles, in particular passenger cars.

An example of an extruded material 10 provided by the manufacturer is illustrated in FIG. 2; it has an overall length 12 (for example of 1400 m) and has a plurality of useful sections 14 which are in a desired and predetermined state. This predetermined state consists of predefined surface qualities and geometries which make it possible to use the extruded material present in the useful sections 14 for the intended purpose as sealing profiles (or as edge protection profiles etc.). The extruded material present in the useful sections 14 is thus of such a quality that it can fulfill a desired function (for example can prevent ingress of water and dirt into an interior space of a body of the passenger car). Each of these defect-free useful sections 14 has a fixed, predefined length 16 (for example 100m).

In the direction of longitudinal extent of the extruded material 10, between two defect-free useful sections 14 there is arranged in each case an intermediate section 18, likewise of fixedly predefined length 20 (for example 1m), which is formed integrally with the useful sections 14 and thus connects the useful sections 14 together. The intermediate section 18 can in particular also consist of the sealing profile. The intermediate section 18 may be defect-free, that is to say likewise be in the predetermined and desired state; however, the intermediate section 18 can also have defects and thus deviate from the desired and predefined state. Such a defect may for example be deviations of its surface quality or surface geometry from a desired target surface quality and target surface geometry, and this can mean that the intermediate section 18 does not fulfill the desired sealing function. Such a defect may in particular be present in the form of a joint or the like, which may make it possible for water and dirt to penetrate into the interior space of the body.

The extruded material 10 is prefabricated at a motor vehicle supplier in the manner shown schematically in FIG. 2, is wound onto a roll or reel and delivered to a motor vehicle manufacturer (process step S1).

At the motor vehicle manufacturer, there follows an application of sealing profile length sections to vehicle components or vehicle bodies. In this case, in step S2, the extruded material provided by the supplier is unreeled from the roll and fed to what is known as an application device, in which—preferably guided by a robot—the extruded material 10 is applied to the vehicle components or vehicle bodies.

In the application device, in a step S3, a length section, required as per the construction variant of the respective body, of the extruded material 10 is cut to length and fitted on the appropriate vehicle component (for example vehicle door, vehicle flap or door cutout of a body). In the process, the length section that has been cut to length is plugged onto corresponding joining flanges of the body and/or adhesively bonded to the vehicle component. Alternatively, the length section can be joined to form a sealing ring by adhesively bonding the two joints, said sealing ring subsequently being applied via a plug connection to a flange region of the vehicle body or vehicle component.

Alternatively, in fitting step S3, the endless extruded material can first of all be applied to the body (or the body component). A sensor is used to sense the reaching of the starting point (at which extruded material was applied around the entire door cutout or around the entire outer contour of the component). Then, the extruded material is severed and the defined cut-off residual length is applied.

Regardless of the manner in which the extruded material is applied to the body or the body component, it is important that the length section which is installed in the vehicle is defect-free. In order to ensure this, only sealing profile from the useful sections 14 of the extruded material 10 is used to produce the length sections, since it is known that these useful sections 14 have no defects. Therefore, first of all a plurality of length sections are cut to length off a fresh roll of extruded material 10 and installed until the end of the defect-free useful section 14 has been reached.

The already used length of the useful section 14 can in this case be determined for example with the aid of an accompanying counter. However, this counter only provides reliable information about the used length of the useful section 14 when the elongation state of the unreeled extruded material corresponds precisely to the elongation state in which the extruded material was prefabricated at the supplier in the manner shown in FIG. 1. If the extruded material is unreeled from the roll at the vehicle manufacturer at a greater tension than it was wound on at the supplier, discrepancies between the counter reading and the "actual" position can occur during the length measurement. In order to avoid such inaccuracies, the extruded material 10 is advantageously provided at the supplier with a periodic calibration pattern 30 (see FIG. 1), which is sensed by the counter at the vehicle manufacturer and is used to calibrate the counter reading. This calibration pattern 30 thus allows an unambiguous correlation between the measures of length used during the prefabrication of the extruded material 10 and the measures of length determined at the vehicle manufacturer.

Prior to the provision of each new length section, it is calculated from the useful length 16 and the current counter reading whether the new length section is entirely within the useful section 14, so that a sufficient amount of defect-free extruded material is available (step S4). If this is not the case, i.e. the end of the useful section 14 has been reached, then, in a step S5, the remaining end piece of the useful section 14 and the following intermediate section 18 are cut off the extruded material 10 and separated out. The intermediate section 18 separated out may have defects or be defect-free; this is not checked during the method 1; regardless of the quality of the intermediate section 18, the latter is cut off and disposed of as waste.

After the intermediate section has been cut off (step S5), the required length section—as per the design of the body type—of the next useful section 14 following the intermediate section 18 is unreeled from the roll in the outlined manner (step S2), cut to length and fitted on the vehicle or component (step S3). This is carried out until the end of this defect-free useful section 14 has been reached (step S4), this being followed by the cutting off and separating out of the next intermediate section 18 following the useful section 14 (step S5). These operations are repeated until the endless sealing profile 10 is been unreeled completely from the roll (step S6) and a further reel on which endless sealing profile 10 has been wound is required (step S7).

The invention claimed is:

1. A method for fitting profiled sealing profiles and edge protection profiles, which are formed from of an extruded profile material, on vehicle bodies or vehicle components, in which the extruded material is unwound from a reel, and length sections of the extruded material are sequentially cut off the unwound extruded material and are fitted as sealing profiles or edge protection profiles on the vehicle bodies or the vehicle components, comprising steps of:
   preparing the extruded material, before being wound onto the reel, in such a way that the extruded material comprises defect-free useful sections having a predefined useful length, between which intermediate sections having a predefined intermediate length are arranged, and
   cutting the intermediate sections out of the extruded material during the fitting of the sealing profiles or edge protection profiles, and separating out as waste.

2. The method of claim 1, wherein the extruded material is provided with a periodic calibration pattern temporally before being wound onto the reel.

3. The method of claim 2, wherein
the calibration pattern of the extruded material is formed by equidistant patterns, points, or lines, which are colored or visible under ultraviolet light.

4. The method of claim 3, wherein
the calibration pattern of the extruded material is applied or introduced on a tear-off material that covers an adhesive point of the extruded material.

5. The method of claim 3, wherein
the calibration pattern of the extruded material is sensed by means of an optical and/or tactile sensing device.

6. The method of claim 3, wherein
one of the sealing profiles or edge protection profiles is adhesively bonded to the vehicle body or the vehicle component, and/or is connected to the vehicle body or the vehicle component via at least one plug connection.

7. The method of claim 6, wherein
a length section is cut off the one sealing profile or edge protection profile, is adhesively bonded at joints and a sealing ring produced in this way is connected to the vehicle body or the vehicle component via a plug connection.

8. The method of claim 2, wherein
the calibration pattern of the extruded material is applied or introduced on a tear-off material that covers an adhesive point of the extruded material.

9. The method of claim 8, wherein
the calibration pattern of the extruded material is formed by mechanical markings.

10. The method of claim 8, wherein
one of the sealing profiles or edge protection profiles is adhesively bonded to the vehicle body or the vehicle component, and/or is connected to the vehicle body or the vehicle component via at least one plug connection.

11. The method of claim 10, wherein
a length section is cut off the one sealing profile or edge protection profile, is adhesively bonded at joints and a sealing ring produced in this way is connected to the vehicle body or the vehicle component via a plug connection.

12. The method of claim 2, wherein
the calibration pattern of the extruded material is formed by mechanical markings.

13. The method of claim 12, wherein
the calibration pattern of the extruded material is sensed by means of an optical and/or tactile sensing device.

14. The method of claim 12, wherein
one of the sealing profiles or edge protection profiles is adhesively bonded to the vehicle body or the vehicle component, and/or is connected to the vehicle body or the vehicle component via at least one plug connection.

15. The method of claim 14, wherein
a length section is cut off the one sealing profile or edge protection profile, is adhesively bonded at joints and a sealing ring produced in this way is connected to the vehicle body or the vehicle component via a plug connection.

16. The method of claim 2, wherein
the calibration pattern of the extruded material is sensed by means of an optical and/or tactile sensing device.

17. The method of claim 2, wherein
one of the sealing profiles or edge protection profiles is adhesively bonded to the vehicle body or the vehicle component, and/or is connected to the vehicle body or the vehicle component via at least one plug connection.

18. The method of claim 17, wherein
a length section is cut off the one sealing profile or edge protection profile, is adhesively bonded at joints and a sealing ring produced in this way is connected to the vehicle body or the vehicle component via a plug connection.

19. The method of claim 1, wherein
one of the sealing profiles or edge protection profiles is adhesively bonded to the vehicle body or the vehicle component, and/or is connected to the vehicle body or the vehicle component via at least one plug connection.

20. The method of claim 19, wherein
a length section is cut off the one sealing profile or edge protection profile, is adhesively bonded at joints and a sealing ring produced in this way is connected to the vehicle body or the vehicle component via a plug connection.

* * * * *